United States Patent Office 3,427,008
Patented Feb. 11, 1969

3,427,008
INSTALLATION AND METHOD FOR THE TREATMENT AT HIGH TEMPERATURE AND COOLING OF GRANULAR OR DIVIDED SOLID PRODUCTS UTILIZING A FLUIDIZED LAYER
Jacques Geoffroy, Forbach, France, assignor to Charbonnages de France, Paris, France, a public institution of France
Filed July 27, 1967, Ser. No. 656,568
Claims priority, application France, July 29, 1966, 71,540
U.S. Cl. 263—21        5 Claims
Int. Cl. F27d 3/00; F26b 3/14, 17/14

ABSTRACT OF THE DISCLOSURE

The present invention relates to an apparatus for the heat treatment of granular or divided solids utilizing a fluidized layer, and to a corresponding method, especially for the sintering of small pellets or agglomerates of light ash. The invention also comprises an installation utilizing the above method. Two superposed zones of different sections and progressively coupled together are provided, namely: a lower zone, provided at its base with a grating traversed by cold air which is given a vertical rising movement, and having a section such that the products located therein are deposited in a fixed layer on the said grating; an upper zone of smaller section and such that the products present in this zone are maintained in the fluidized state by the combustion gases issuing from the lower zone.

---

Figure 1:
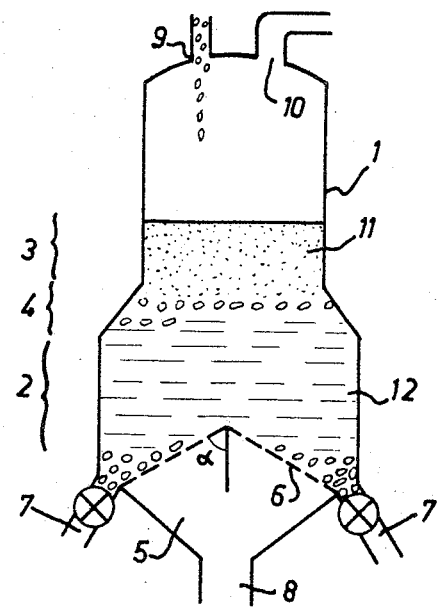

The present invention relates to an apparatus for the heat treatment of granular or divided solids utilizing a fluidized layer, and to a corresponding method, especially for the sintering of small pellets or agglomerates of light ash. The invention also comprises an installation utilizing the above method.

When a high-temperature treatment of granular or finely-divided solids is effected in a fluidized layer, there are obtained after treatment a solid and combustion gases at the temperature of the fluidized layer.

In order to improve the heat balance of the installation, it is current practice to install recuperation stages on the upstream and downstream sides of the fluidization chamber.

Generally speaking, no difficulties of a technological nature or encountered in the recovery of the sensible heat of the hot gases passing out of the fluidized layer, for the purpose of pre-heating the fluidizing agent or drying and pre-heating the crude solid to be treated.

On the other hand, the recuperation of the sensible heat of the products treated presents difficult technological problems in view of the physical nature of the hot products to be handled.

The present invention concerns in the first place, an apparatus which on the one hand enables the treatment in a fluidized layer at high temperature of divided solids which do not contain large quantities of dust to be effected, and on the other hand permits the recuperation, without complicated and costly adaptation, of the maximum of sensible heat of the treated solids and of the combustion gases passing out of the fluidized layer of solids during the course of treatment.

The apparatus according to the invention is characterized in that it comprises two superimposed zones of different sections coupled together progressively, namely;

A lower zone provided at its base with a grid through which passes the cold air having an upward vertical movement, and having a section such that the products in the said zone are deposited in a fixed layer on the said grid;

An upper zone of smaller section and such that the products located therein are maintained in the fluidized state by the combustion gases passing out of the lower zone.

The apparatus is furthermore provided with:

Means for maintaining the temperature of the upper fluidized layer at a substantially constant value;

Means for introducing a regulated flow of products to be treated, dried and pre-heated when so required;

And means for extracting an adjustable volume of products, located at the base of the lower zone.

In accordance with other characteristic features:

The grid located at the base of the lower zone has the shape of a cone with its apex pointing upwards, having a half-apex angle at most equal to the dynamic angle of repose of the products treated;

The extraction orifices for the treated products are located at the periphery of the said grid.

The invention also relates to a method of sintering small pellets of light ash employed in the apparatus described, the said method being characterized in that it consists:

Of introducing into the upper zone of the apparatus a constant flow of pellets dried and pre-heated by the gases issuing from the fluidized layer;

Of maintaining constant the flow of cold air admitted into the base of the lower zone;

Of maintaining at a substantially constant value the temperature of the upper fluidized layer by means of a variable flow of supplementary fuel;

Of maintaining at a substantially constant value the height of the fixed lower layer by regulating the output of solids extracted from the base of the lower zone.

The invention finally concerns an installation for carrying the above method into effect, characterized in that it comprises, in combination:

A pelletizing disc;

A drier-pre-heater rotating screen for the pellets, through which pass the hot combustion gases issuing from the upper fluidized layer;

And the apparatus according to the invention, into which the dried and pre-heated pellets to be treated are introduced.

Other advantages and characteristic features of the present invention will be brought out in the description which follows below with reference to the accompanying drawings, showing in diagrammatic manner in FIG. 1, one form of construction of the chamber according to the invention, and in FIG. 2 an installation more particularly adapted to the manufacture of sintered aggregates of light ash.

The chamber 1 shown in FIG. 1, and in which the divided solid products are subjected to the desired treatment at high temperature, comprises in accordance with the invention:

A lower zone 2 of relatively-large section;

An upper zone 3 of smaller section, progressively coupled to the lower zone by means of the intermediate zone 4.

The lower zone is provided at its base with an air-box 5 surmounted by a grating 6 having the shape of a truncated cone, with a half-angle at the apex which is preferably at most equal to the dynamic angle of repose of the product to be treated.

The lower zone is provided in addition with extraction conduits 7 with adjustable output, located at the periphery of the grating 6, and with a conduit 8 for introducing cold air, delivering into the air-box 5.

The solids to be treated, pre-heated if so required, are introduced at 9 into the upper part of the zone 3, the combustion gases issuing from the treatment layer being evacuated at 10 and directed as required to a physical or chemical treatment installation or to an installation for recovering their sensible heat.

The sections of the zones 2 and 3 are such that, depending on the granular size of the products and on the rate of air-flow admitted at 8:

(1) In the lower zone 2, the speed of the rising air is less than the speed necessary for the maintenance in a fluidized bed of the products present in that zone;

(2) In the upper zone 3, the speed of the combustion gases issuing from the zone 2 is higher than the speed necessary to maintain in a fluidized layer the products introduced at 9, but should however be less than the speed required for the gases to carry away the said products.

There are thus established in the chamber two directly superposed layers, a layer 11 kept in the fluidized state and a fixed layer 12 resting on the grating 6.

The treatment at high temperature is effected in the fluidized layer, the temperature of which is maintained substantially constant, if necessary by the introduction of supplementary fuel.

The hot treated solids are deposited in a fixed layer 12 in proportion to the introduction at 9 of the crude products to be treated.

The air admitted at 8 is pre-heated by direct contact with the hot products deposited in a fixed layer, the cooled solids being extracted at 7 from the base of the fixed layer 12, the shape of the grating 6 facilitating the flow of the solids treated.

The advantages of the device described are obvious:

The chamber described does not comprise, at the base of the fluidized layer 11, any distributor grating for the fluidizing agent. By this means, the cost of construction of an element required to withstand the high temperatures existing in the fluidized layer is avoided and the well-known irregularities of operation of this kind of apparatus, mainly due to the fouling and wear of the distributor grating for fluidizing air, are eliminated.

In addition, the delicate and costly devices for extracting a very hot solid product are dispensed with. Finally, the heat balance of the apparatus is an optimum, since it is only necessary to dimension judiciously the height of the fixed layer 12 in order to extract a solid which is as cold as may be desired.

The apparatus described is suitable for all heat treatments of divided solids, accompanied or not by chemical or physical surface treatment.

Thus, the apparatus described is particularly well suited to the treatment by calcination and sintering of agglomerates of light ash (by-products of thermal power stations heated by coal) obtained by any known means, for example by means of a pelletizing disc.

Figure 2:
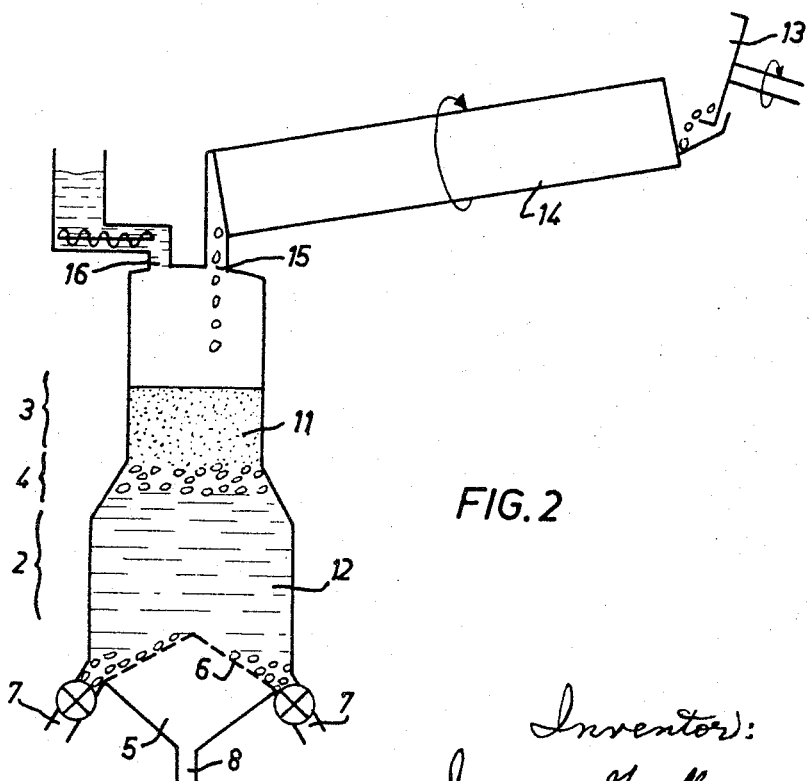

FIG. 2 shows in a diagrammatic manner an installation according to the invention utilizing the above apparatus and carrying into effect the method of the present invention, following which:

The very fine light ash, mixed if so desired with lime or cement, is converted into small pellets in a pelletizing disc 13, the operation of which is regulated so as to obtain pellets having a diameter comprised between 3 and 20 mm. for example and which have a humidity content comprised between 20 and 25%;

The pellets are dried and pre-heated in a rotating screen 14 which advantageously utilizes as a source of heat, the hot combustion gases issuing from the fluidized layer 11;

The dried and pre-heated pellets are introduced as 15 into the chamber 1, the orifice 15 serving simultaneously as an introduction orifice for the products to be treated and as an evacuation orifice for the hot combustion gases;

The pellets fall into the fluidized upper layer 11, the temperature of which is kept substantially constant at 1,000° C. by means of a supplementary fuel burned in the fluidized layer 11, for example coal introduced at 16, by means of the air pre-heated by exchange of heat with the sintered pellets which are deposited to form the fixed layer 12.

The temperature of the solids extracted at 7 is in the vicinity of 200° C., while the temperature of the air passing out of the fixed layer 12 and maintaining the layer 11 in the fluidized state is about 800° C.

The regulation of the installation can be effected in the following manner;

The rate of feed of the dried and pre-heated pellets introduced at 15 is kept constant;

The flow-rate of cold air admitted at 8 is also maintained constant;

The temperature of the fluidized layer is kept constant by regulating the supply of the supplementary fuel, in the present case the feed of coal introduced at 16;

The height of the fixed layer 12 is kept constant by regulating the rate of extraction at 7 of the cooled solids obtained.

It will of course be understood that the present invention has only been described and illustrated purely by way of explanation and not in any limitative sense, and that any modification may be made thereto without departing from its scope.

In particular, it may happen that the treatment in the fluidized layer 11 is exothermic. In this case, and in accordance with an alternative form of the method according to the invention, it will be necessary to introduce a cooling fluid, gaseous or liquid.

Thus, on the other hand, in order to preserve the granular size of treated pellets which do not have very great hardness, a pre-heated device other than a rotating screen can be utilized, for example a moving grating for recovery of heat.

I claim:

1. Apparatus for the thermal treatment of granular or divided solids in a fluidized layer, comprising:
    means for introducing into the base of said apparatus a flow of cold air having a vertical rising movement;
    a lower zone provided at its base with a grating through which passes said current of cold air;
    said lower zone having a section such that the products located therein are deposited in a fixed bed on said grating;
    an upper zone of smaller section than said lower zone;
    the section of said upper zone being such that the products present in said zone are maintained in the fluidized state by the combustion gases passing out of said lower zone;
    an intermediate zone of progressive coupling between said lower zone and said upper zone;
    means for introducing a regulated flow of products to be treated into the top of said upper zone;
    means for evacuating from the top of said upper zone the combustion gases issuing from said fluidized layer; and
    means for extracting from the base of said lower zone an adjustable volume of products.

2. An apparatus as claimed in claim 1, in which said grating located at the base of said lower zone has the shape of a cone with its apex turned upwards, having a half apex-angle at most equal to the dynamic angle of repose of the products treated.

3. A method of sintering pellets of light ash by means of the apparatus as claimed in claim 1, said method consisting of:
    introducing into the upper zone of said apparauts a constant flow of pellets dried and pre-heated by the combustion gases issuing from said fluidized layer;
    maintaining constant the flow of cold air admitted to the base of said lower zone;
    maintaining at a substantially constant value the temperature of the fluidized upper layer by means of a supplementary fuel with adjustable flow; and maintaining at a substantially constant value the height of the fixed lower layer by regulating the flow of solids extracted from the base of said lower zone.

4. An installation for sintering light ash in the form of pellets or agglomerates, comprising:
   a treatment chamber;
   means for introducing into the base of said chamber a flow of cold air having a vertical upward movement;
   a lower zone provided at its base with a grating through which passes said flow of cold air;
   said lower zone having a section such that the products located therein are deposited in a fixed layer on said grating;
   an upper zone of smaller section than said lower zone;
   the section of said upper zone being such that the products persent therein are maintained in the fluidized state by the combustion gases issuing from said lower zone;
   an intermediate zone of progressive coupling between said lower zone and said upper zone;
   a pelletizing disc for the formation of pellets from ash;
   means for introducing into the top of said upper zone a regulated flow of said pellets;
   means for introducing a regulated flow of supplementary fuel into said upper zone;
   means for evacuating from the top of said upper zone the combustion gases issuing from said upper zone; and
   means for extracting a regulatable volume of products from the base of said lower zone.

5. An installation as claimed in claim 4, in which a drier and pre-heater rotating screen is disposed between said pelletizing disc and the upper zone.

References Cited

UNITED STATES PATENTS

| 2,638,684 | 5/1953 | Jukkola | 34—10 X |
| 2,651,565 | 9/1953 | Bergman. | |
| 2,668,041 | 2/1954 | Knibbs. | |
| 2,761,769 | 9/1956 | Elder | 34—10 X |
| 2,763,478 | 9/1956 | Parry. | |
| 3,197,883 | 8/1965 | Hartert et al. | |
| 3,295,221 | 1/1967 | Joy. | |
| 3,298,792 | 1/1967 | Di Drusco. | |

FOREIGN PATENTS

| 755,579 | 8/1956 | Great Britain. |

FREDERICK L. MATTESON, Jr., *Primary Examiner.*

R. A. DUA, *Assistant Examiner.*

U.S. Cl. X.R.

34—10, 57